United States Patent [19]
Lofthus et al.

[11] Patent Number: 5,530,642
[45] Date of Patent: Jun. 25, 1996

[54] CONTROL SYSTEM FOR ASPECT RATIO AND MAGNIFICATION OF A RASTER OUTPUT SCANNER

[75] Inventors: Robert M. Lofthus, Honeoye Falls; Stuart A. Schweid, Henrietta; Aron Nacman, Penfield; Michael S. Cianciosi, Rochester, all of N.Y.

[73] Assignee: Xerox Corporation, Stamford, Conn.

[21] Appl. No.: 338,302

[22] Filed: Nov. 14, 1994

[51] Int. Cl.$^6$ .................................................. G05B 19/02
[52] U.S. Cl. ............................................. 364/174; 347/261
[58] Field of Search ................................. 364/174, 561; 347/139, 247–250, 237, 261, 232; 358/481, 474; 359/216–219; 395/102

[56] References Cited

U.S. PATENT DOCUMENTS

| | | | |
|---|---|---|---|
| 4,734,715 | 3/1988 | Shiraishi | 347/261 |
| 4,807,156 | 2/1989 | Parisi | 395/102 |
| 4,975,626 | 12/1990 | Yagi et al. | 347/261 |
| 5,237,521 | 8/1993 | Raj et al. | 364/561 |
| 5,239,313 | 8/1993 | Marko et al. | 347/139 |
| 5,253,085 | 10/1993 | Maruo et al. | 358/481 |
| 5,381,165 | 1/1995 | Lofthus et al. | 347/232 |

*Primary Examiner*—Roy N. Envall, Jr.
*Assistant Examiner*—Steven R. Garland
*Attorney, Agent, or Firm*—R. Hutter

[57] ABSTRACT

A control system for a ROS scanner in which the aspect ratio and magnification of an image is controlled by precise, real-time control of the relative velocities of the polygon mirror and the photoreceptor. Values related to monitored measurements of polygon mirror and photoreceptor velocity are mathematically combined with a reference clock value and other factors to yield real-time control signals. The control signals operate the polygon and photoreceptor motors to obtain a desired magnification and aspect ratio of images created on the photoreceptor.

7 Claims, 2 Drawing Sheets

CONTROL SYSTEM FOR ASPECT RATIO AND MAGNIFICATION OF A RASTER OUTPUT SCANNER

INCORPORATION BY REFERENCE

This application incorporates by reference U.S. Pat. No. 5,237,521, assigned to the assignee hereof.

1. Field of the Invention

The present invention relates to a control system for a raster output scanner (ROS), such as in an electrophotographic printing machine, which enables the ROS to create images of selectable magnification and aspect ratio.

2. Background of the Invention

Electrophotographic printers wherein a laser scan line is projected onto a photoconductive surface are well known. In the case of laser printers, facsimile machines, and the like, it is common to employ a raster output scanner (ROS) as a source of signals to be imaged on photographic film or an electrostatically charged photoreceptor (a photosensitive plate, belt, or drum) for purposes of printing. The ROS provides a laser beam which switches on and off according to electronic image data associated with the desired image to be printed as the beam moves, or scans, across the charged photoreceptor. Commonly, the surface of the photoreceptor is selectively imagewise discharged by the laser beam in locations to be printed white, to form the desired image on the photoreceptor. Modulation of the scanned beam creating the desired latent image on the photoreceptor is typically implemented by digitally controlling the output of a high speed laser diode or a modulator associated with a continuous laser source. A common technique for deflecting the modulated laser beam to form a scan line across the photoreceptor surface uses a rotating optical polygon with reflecting surfaces; the laser beam from the source is reflected by the facets of the polygon, creating a scanning motion of the beam, which is optically focused to form a sharp scan line across the photoreceptor. A closely spaced regular array of scan lines on a photoreceptor together form a raster of the desired latent image. Once a latent image is formed on the photoreceptor, the latent image is subsequently developed with toner, and the developed image is transferred to a print sheet, as in the well-known process of electrophotography.

When a large number of raster output scanners are made in a large manufacturing process, it is desirable that very high consistency exist among the large number of individual machines of a given model. One source of inconsistency among a large number of printers of a given design relates to the relative and absolute dimensions of images created on the photoreceptor. The two most important parameters in determining the configuration of images from a particular example of a ROS are the magnification, which is the absolute size of an image created on the photoreceptor, and the "aspect ratio," which is broadly defined as the relative dimensions of the "height" to the "width" of a given image on the photoreceptor. Both of these parameters are ultimately directly affected by the placement of individual pixel spots on the photoreceptor, which in turn is affected by the relative velocities of the polygon and the photoreceptor motor. The speed of the polygon will have a direct bearing on the closeness of pixel spots along each scan line in a raster image as well as the spacing between scan lines on the photoreceptor, while the speed of the photoreceptor will have an effect on the spacing between the scan lines on the photoreceptor. For example, if there is a constant modulation rate from a laser source, an increase in speed of the polygon will cause the resulting spots on photoreceptor to be closer together along the scan line as well as causing the scan lines forming the raster to be spaced closer together; similarly, a faster speed of the photoreceptor will generally cause the scan lines forming the raster to be spaced farther apart. Therefore, control of the configuration of an image formed on a photoreceptor with a ROS is dependent on the absolute and relative speeds of the polygon and the photoreceptor.

U.S. Pat. No. 4,807,156 discloses an image print magnification system for a ROS scanner wherein the operation of the scanner is controlled by a master clock, which outputs a consistent relatively high frequency. This high-precision output from the clock is converted down to a more usable frequency by the various motors in the scanning system by means of "cycle stealers", which reduce the frequency of the crystal clock by blocking out regular subsets of the clock outputs.

U.S. Pat. No. 5,237,521, incorporated herein by reference, discloses a "high resolution position measurement system" which determines the cumulative position and average velocity of a rotating body, such as a stepper or servo motor, as would be found in an electrophotographic printer. The advantage of this particular design described in the patent is that it avoids cumulative errors which may result from miscounting of fractional portions of signal cycles from encoders associated with a motor. Further, the design of the system in this patent is capable of outputting a digital word representative of either the position or velocity of the rotating body. The system of this patent thus enables very precise position and velocity control of any number of stepper or servo motors with negligible error propagation.

U.S. Pat. No. 5,239,313 discloses a laser printer which is capable of printing output of a selected resolution between 75 SPI and 900 SPI, by changing various combinations of the laser spot size, paper motion speed, video data rate, and scanner speed.

SUMMARY OF THE INVENTION

According to one aspect of the invention, there is provided a method of controlling a raster output scanner having a light source for emitting a modulated beam according to digital data at a pixel clock rate and a rotatable polygon mirror for causing the modulated beam to scan across a photosensitive surface in a fast-scan direction. A reference clock rate is established and a reference clock rate value is derived therefrom. Polygon mirror velocity is monitored and a polygon mirror velocity value is derived therefrom. A polygon mirror control value is determined as a function of the reference clock rate value, the polygon mirror velocity value, and a predetermined control factor. The polygon mirror is caused to rotate at a selected velocity related to the polygon mirror control value.

According to another aspect of the invention, there is provided a method of controlling a raster output scanner having a light source for emitting a modulated beam according to digital data at a pixel clock rate, a rotatable polygon mirror for causing the modulated beam to scan across a photosensitive surface in a fast-scan direction, and a motor for moving the photosensitive surface. A reference clock rate is established and a reference clock rate value is derived therefrom. The real-time velocity of the motor is monitored motor velocity and a motor velocity value is derived therefrom. A motor control value is determined as a function of the reference clock rate value, the motor velocity value, and a predetermined first control factor, and a velocity to rotate the motor is selected as a function of the motor control value. The polygon mirror velocity is monitored and a real-time polygon mirror velocity is derived therefrom. A polygon mirror control value is determined as a function of the reference clock rate value, the polygon mirror velocity value, and a predetermined control factor. A velocity to rotate the polygon mirror is selected as a function of the polygon mirror control value.

DETAILED DESCRIPTION OF THE INVENTION

Figure 1:
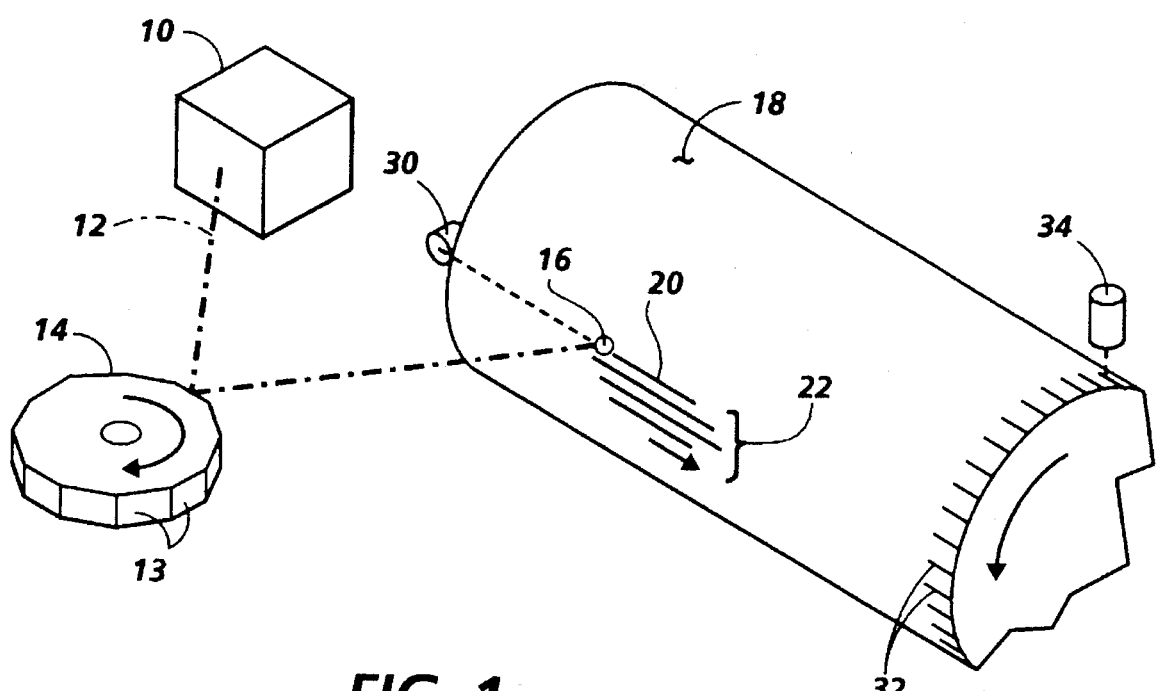
FIG. 1 is an elevational view showing the basic elements of a ROS scanner as used with the present invention.

FIG. 1 shows the basic configuration of a scanning system used, for example, in an electrophotographic printer or facsimile machine. A laser source 10 produces a collimated laser beam, also referred to as a "writing beam," 12 which is reflected by the facets of a rotating polygon 14. Each facet 13 of the polygon 14 in turn deflects the writing beam 12 to create an illuminated spot 16 on the pre-charged surface of photoreceptor 18, which in this case is a rotating drum. Laser source 10 also includes means for modulating the beam 12 according to image data entered therein. The localized light flux in spot 16 incident at a particular location on the surface of photoreceptor 18, corresponding to a picture element (pixel) in the desired image, discharges the surface for pixels of the desired image which are to be printed white. In locations having pixels which are to be printed black, writing beam 12 is momentarily interrupted through the action of a modulator within source 10, so that the pixel area at that location on the surface of photoreceptor 18 will not be discharged. Thus, digital data input into laser source 10 is rendered line by line as an electrostatic latent image on the photoreceptor 18.

The rotational motion of polygon 14 results in a spot 16 moving across photoreceptor 18 to form a scan line 20, of length $L_{scan}$, of selectively discharged areas on photoreceptor 18. At the same time, the surface of photoreceptor 18 is translated at a constant velocity (by a photoreceptor motor, not shown) so that the periodic scanning of spot 16 across the moving photoreceptor 18 creates an even, closely spaced array of scan lines 20, called a raster 22, on the photoreceptor 18. The pattern of discharged and charged pixel areas within the raster 22 forms the desired image to be printed. Such a configuration as in FIG. 1 may further include any number of lenses, mirrors and translational mechanisms to accommodate a specific design. Also, as is known in the art of electrophotography, the associated charging and development systems (not shown) associated with photoreceptor 18 may be adapted so that either the charged or discharged areas of the electrostatic latent image correspond to "print-black" areas in the printed image.

In addition to the basic image-making elements of a ROS shown in FIG. 1, there is, in a practical system, any number of control features to ensure that latent images are precisely and accurately placed on the surface of photoreceptor 18. In order to create high-quality images, there must be precise and accurate coordination of the motion of the photoreceptor 18, the motion of the polygon 14, and the timing and clock rate of digital data used to modulate the beam from source 10. In the prior art there has been proposed any number of schemes for obtaining the necessary feedback for monitoring the exact physical positions and velocities of the various parts. Typical of such means for obtaining feedback include the start-of-scan detector indicated as 30, and the encoder marks 32 on one edge of photoreceptor 18 which are monitored by a photoelectric device such as 34. The function of the start-of-scan detector 30 is to detect, at the beginning of each scan, a portion of the beam 12 reflected from a facet of polygon 14. As can be seen, the start-of-scan detector 30 is in the form of a photosensor placed in a position consistent with the beginning of each scan line 20 on photoreceptor 18. When light from beam 12 is detected on the start-of-scan detector 30, the system as a whole obtains precise information that the polygon 14 is in a position to start a new scan line 20, and therefore the apparatus for modulating the light beam from source 10 will be signalled precisely when to begin a new line of data. Similarly, the encoder marks 32 at the edge of photoreceptor 18 provide positional references for the motion of photoreceptor 18 as it is moved by a motor (not shown), and the frequency of the dark areas of the encoder marks 32 as they pass under photoelectric element 34 provide a strobe source by which the velocity of the photoreceptor 18, whether it is a belt or a drum, can be determined.

There is shown in FIG. 1 only the most rudimentary types of start-of-scan and encoder devices. There exists in the prior art any number of relatively sophisticated systems for accomplishing the basic function. It will be assumed that any compatible system for determining the position or velocity of photoreceptor 18, or the start-of-scan position of polygon 14, will be suitable under the claimed invention. It will also be apparent that in addition to detecting the light beam 12, or the encoder marks 30, such position or velocity detecting means may relate directly to the behavior of the motors controlling the photoreceptor 18 and/or the polygon 14.

As the term is used below, the length of the scan line 20, given as $L_{scan}$, is a fixed parameter of the scanning hardware, particularly the geometry of polygon 14 relative to photoreceptor 18. $L_{scan}$ relates to the length of sweep of a single facet of polygon 14 during the time the facet is available to reflect the beam 12 in the scanning process. $L_{scan}$ should be of such a length that the scan line effectively covers both the entire width of photoreceptor 18 and also the start-of-scan detector 30.

Figure 2:
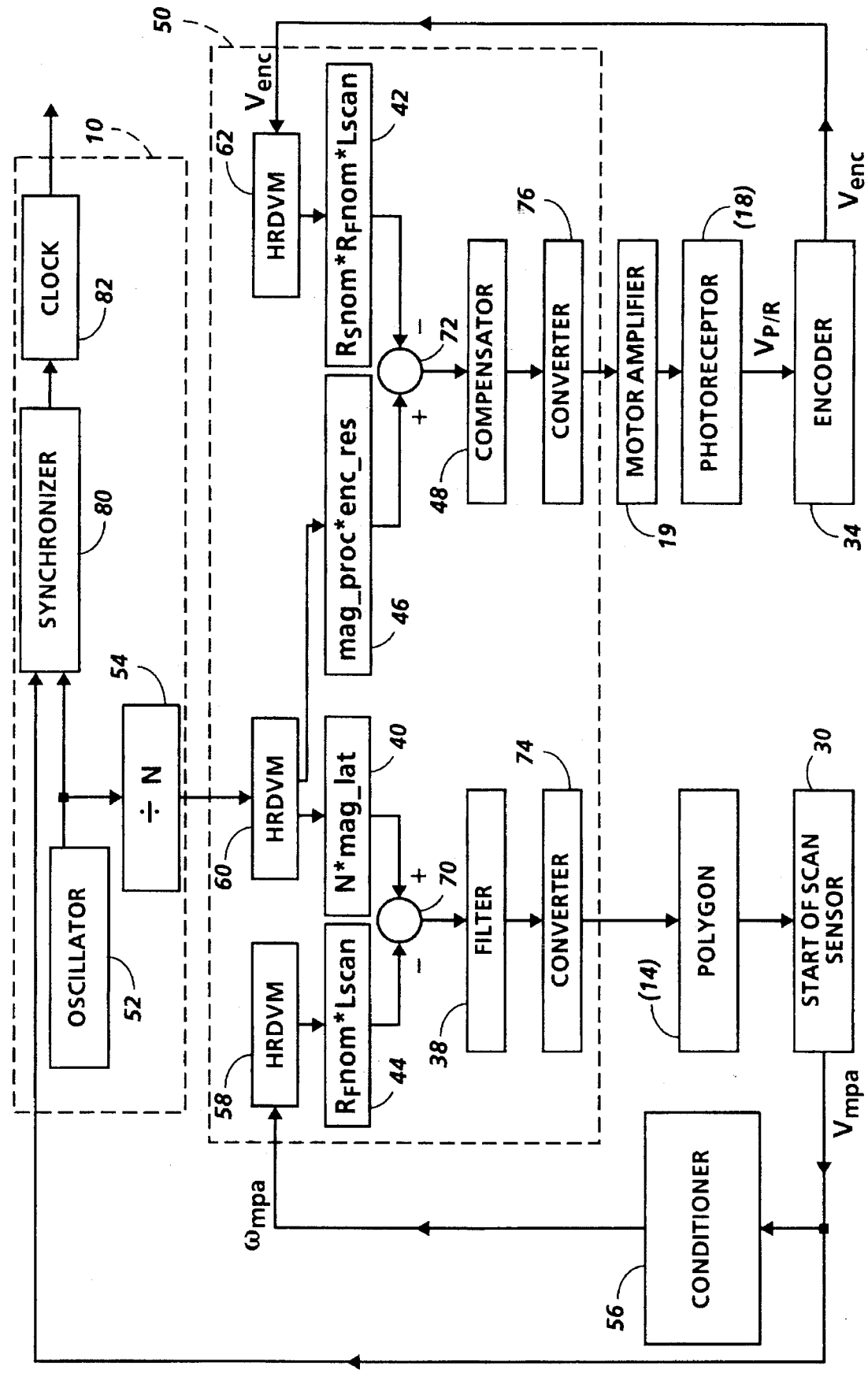
FIG. 2 is a systems view showing the basic elements of the present invention.

FIG. 2 is a systems diagram illustrating the control system of the present invention. Certain of the elements of the diagram of FIG. 2, such as the laser source 10, start-of-scan sensor 30, encoder sensor 34, are apparent from the physical diagram of FIG. 1. Also shown schematically in FIG. 2 are certain elements which relate to the polygon mirror 14, and photoreceptor 18, and indicate motors controlling the respective elements.

The central control apparatus of the present invention is shown generally within a microcontroller indicated as 50. This microcontroller 50 can be embodied in, for example, a microprocessor or equivalent device, and is responsive to both real-time measurements of the behavior of the physical elements of the ROS, and also to external commands which may be provided either directly by the user of the printer or incidental to a package of image data which is being formed into an image by the ROS. The function of the controller 50 is to control the surface speed of the photoreceptor 18 and to control the angular velocity of the polygon 14 so that the ROS will be able to output an image of the desired magnification and aspect ratio. The microcontroller 50 accepts as inputs the input of a reference clock, which is a constant-rate clock input which oversees the entire system (and which may be derived ultimately from a crystal oscillator such as 52), and real-time substantially periodic inputs from the start-of-scan sensor 30 and the photoreceptor encoder 34 (or, of course, any equivalent structure for monitoring the behavior of polygon 14 and photoreceptor 18).

Referring back to FIG. 2, the parameters which are necessary to output an image of a given magnification and aspect ratio include certain parameters which are inherent in the physical apparatus and therefore generally do not change, such as the scan line length $L_{scan}$, the photoreceptor encoder resolution, enc_res, the crystal oscillator "divide down" value N, and the nominal slow scan and fast scan resolutions, $R_S$nom and $R_F$nom, respectively. However, certain other parameters relating to the desired image magnification and aspect ratio of a particular job, particularly the process, or slow scan, direction magnification, mag_proc, and the lateral, or fast scan, direction magnification, mag_lat, must be entered into the controller 50 beforehand. The outputs of the microcontroller 50 are signals relating to the desired rotational velocity of the polygon 14 and the surface velocity photoreceptor 18. These outputs may be in the form of, for example, voltages applied to PWM amplifiers used with DC motors, signals applied to stepper motors, voltages which are applied to voltage-controlled oscillators, or any other system known in the art in which a given signal can be precisely and accurately converted into a desired rotational speed of a motor.

Looking at the real-time inputs to microcontroller 50 at the top of FIG. 2, there can be seen three inputs. One input is the reference clock input which is derived from crystal oscillator 52. This initial reference clock may be divided down into a more convenient rate such as by divider 54, and then fed into the microcontroller 50. Another input, the start-of-scan sensor 30 output, which is a real-time measurement of the motor polygon assembly velocity $V_{mpa}$, is typically "conditioned" into a TTL squarewave, such as through conditioner 56, now labeled $\omega_{mpa}$, and fed into microcontroller 50. Similarly, the output from photoreceptor encoder 34, labeled $V_{enc}$, is input into microcontroller 50. For all of these real-time inputs, each is first fed into a "high resolution digital velocity measurement" scheme, herein referred to as an HRDVM.

These HRDVM's, shown respectively as 58, 60, and 62, are described in U.S. Pat. No. 5,237,521, incorporated herein by reference, and serve to determine with sufficient accuracy and precision the cumulative position and periodic average velocity represented by each of the inputs. HRDVM's represent hardware-software combinations, particularly including a software algorithm that converts a signal, such as from an incremental encoder, into a digital word that represents the instantaneous frequency or velocity of the input, by counting with high precision the number of cycles and partial cycles occurring during a sample period. (As used herein, the terms "frequency" and "velocity" of the motor polygon assembly 14 or photoreceptor 18 will be used interchangeably; one skilled in the art will recognize that a frequency of rotation is equivalent to a shaft velocity.) There will thus be output, from each HRDVM 58, 60, and 62 respectively, digital words representative of, and preferably proportional to, the behavior of the polygon 14, reference clock from crystal oscillator 52, and the photoreceptor encoder 34.

Turning first to the feedback loop in the right portion of FIG. 2, the output of HRDVM 60, a digital word representing the divided down pixel clock, scaled by multipiers 40 and 46, is input positively into summing junction 72. Similarly, the output of HRDVM 62, a digital word representing the surface velocity of the photoreceptor 18, scaled by multiplier 42, is input negatively into summing junction 72. This use of summing junction 72, as well as multiplier terms 40, 42, and 46 is derived as follows.

Pixel clock frequency is given by $$pxlclk = RS*RF*L_{scan}*V_{P/R}$$

where
 $L_{scan}$=total length of a scan line (in/line)
 $V_{P/R}$= surface velocity of photoreceptor (in/sec)
 $R_S$= slow scan resolution, (lines/in)
 $R_F$= fast scan resolution, (spots/in)
Now define, $$R_S = \frac{R_S\text{nom}}{mag\_proc}$$

$$R_F = \frac{R_F\text{nom}}{mag\_lat}$$

Where $R_S$nom, $R_F$nom are the given, nominal design values, and mag_proc and mag_lat are the desired magnification in the process and lateral directions, respectively.

For a photoreceptor with an encoder resolution enc_res (expressed in encoder marks/inch), as seen in FIG. 1, the surface velocity of the photoreceptor is measured in encoder counts/sec and expressed as $$V_{enc}=V_{P/R}*enc\_res$$

Combining these equations and utilizing the definitions for $R_S$ and $R_F$ yields, after some manipulation, $$(mag\_lat*mag\_proc*enc\_res)*pxlclk = (R_S\text{nom}*R_F\text{nom}*L_{scan})*V_{enc} \qquad (1)$$

Equation 1 embodies within it the multipiers 40, 42, and 46 and defines an "electronic gearbox" whereby the measured photoreceptor velocity, $V_{enc}$ tracks the pixel clock frequency, pxlclk, by a proportionality constant that is a function of four constant design parameters, i.e., $R_F$nom, $R_S$nom, $L_{scan}$ and enc_res, and two variable parameters, i.e., mag_lat and mag_proc. This is more clearly seen by rewriting equation 1 as follows:

$$V_{enc} = pxlclk \frac{mag\_lat*mag\_proc*enc\_res}{R_S\text{nom}*R_F\text{nom}*L_{scan}}$$

The reason the above equations do not appear to exhibit the effect of a summing junction (by the presence of a+ sign, for example) is that the effective subtraction occurs between $V_{enc}$ and pxlclk, each multiplied by multipliers as shown; in the above equations, for convenience, the values of $V_{enc}$ and pxlclk are placed on opposite sides of a=sign, which obscures the action of the summing junction. The output of summing junction 72, after suitable compensation 48 (discussed below) and amplification, such as by DC motor amplifier 19, is used as the control signal for the photoreceptor velocity control loop. The frequency of the calculations in the preferred embodiment of the invention should be so high as to have at least an effect of continuous recalculation. In any digital computer, calculations are performed as discrete events; generally only with an analog computing system would a truly continuous multiplication, addition or subtraction of input values be possible.

Turning next to the feedback loop in the left portion of FIG. 2, the output of HRDVM 60, a digital word representing the divided down pixel clock, is scaled by multiplier 40 and input positively to summing junction 70. Similarly, the output of HRDVM 58, a digital word representing the angular velocity of the motor polygon assembly 14, $\omega_{mpa}$, is scaled by multiplier 44, then negatively input into summing junction 70. As done above, the use of the summing junction 70 as well as multiplier terms 40 and 44 will also be derived. Note that $$pxlclk = R_F * L_{scan} * \omega mpa$$

where $\omega_{mpa}$ is a once-per-facet signal as seen by the start-of-scan sensor 30 in FIG. 1.

Using the previous definitions, the above equation can be rewritten as $$mag\_lat * pxlclk = (R_F \, nom, L_{scan}) * \omega_{mpa} \quad (2)$$

which is expressed in the left-hand-side of the microcontroller 50.

In summary, the fixed machine parameters are $R_F$nom, $R_S$nom, $L_{scan}$, and enc_res; the user-desired variables are overall image magnification and aspect ratio, the latter previously defined as the ratio of the "height" to "width" of the image on the photoreceptor. In the examples that follow it will be shown how the user-desired variables, overall magnification and aspect ratio, can be converted to values of mag_lat and mag_proc.

Define the aspect ratio as $$\text{aspect ratio} = \frac{mag\_prooc}{mag\_lat}$$

Case 1: increase overall image area magnification by 10% as compared to the nominal case:

mag_lat*mag_proc=1.1;

mag_lat=mag proc= 1.04881

Case 2: decrease overall image area magnification by 10% and increase the aspect ratio by 5% as compared to the nominal case:

mag_lat*mag proc=0.9, and mag_proc/mag_lat=1.05;

mag_lat=0.92582, mag_proc=0.97211

As might be expected, this type of mathematical manipulation can be performed at a high level, for example, within the basic application program in which the document to be printed is created, or else in some other intermediate software between a document-creating computer and the printer.

The outputs of summing junctions 70 and 72, respectively, are fed, eventually, into means which convert the outputs into real-time values which can be directly used by, for example, the motors associated with motor polygon assembly 14 and photoreceptor 18. These means are shown in FIG. 2 as 74 and 76, respectively. As the output of the summing junctions 70, 72 are typically just digital values, the function of means 74 and 76 may include, for example, a digital-to-analog converter, an amplifier, and a voltage-controlled oscillator. In this way, the digital word is converted (by direct D/A conversion or through a look-up table) to an analog voltage, which is in turn converted, through a voltage-controlled oscillator, to a pulse train which may be, for example, applied to a stepper motor or other type of brushless motor, which is then used to control the motors for polygon 14 or motor 19 for the photoreceptor 18. In FIG. 2, the motor and other devices which cause the desired rotation of motor polygon assembly 14 according to the control values is indicated as (14). Alternately, the digital output from the summing junctions 70, 72 could be applied to some type of frequency synthesizer whereby a digital input could be synthetically converted into an output of a specific frequency. This frequency will, of course, be related to the desired rotational speeds of the polygon 14 and photoreceptor 18.

Another preferred feature in the present invention is to include, after the summing junctions 70 and 72, compensation filters 38 and 48, respectively, or software performing a filtering function, effectively including at least a single integration term. As known by one of skill in the art of feedback control, the presence of at least a single integrator term will ensure zero, steady-state velocity error during tracking. Specifically, in terms of the DC values of the velocity variables, the presence of at least one integrator term in both compensation filters mean that the DC value of $\omega_{mpa}$ will equal the DC value of the pxIclk multiplied by an errorless scalar, namely, $((mag\_lat)/(R_F \, nom*L_{scan}))$. Similarly, the DC value of $V_{enc}$ will equal pxlclk times an errorless scalar, namely, $(mag\_lat*mag\_proc*enc\_res)/(R_F nom*R_F nom*Lscan)$.

The output of start-of-scan sensor 30 is sent not only to conditioner 56 and HRDVM 58, but is also sent to a synchronizer circuit 80 which forms part of the laser source 10. Synchronizer circuit 58 accepts as input not only the input from start-of-scan sensor 30 but also an output directly from crystal oscillator 52, which serves as another timing control. The output of synchronizer circuit 80 is then fed to the pixel clock 82 which, as is known in the art of ROS scanning, controls the precise rate of modulation (pixel data per unit time) which controls the source 10.

The values of the control factors mag_lat and mag_proc are shipped to the microcontroller 50 via a serial bus from the controller of the printer. Fixed values of mag_lat and mag_proc may be typically set for individual printing machines in a manufacturing run, so that all examples of a type of machine will output images of the same size. The necessary lateral and process direction measurements of magnification can be done off line by a technical representative or customer, and/or as a final manufacturing step.

In a practical embodiment of the invention, the use of HRDVM's is desirable because the proper performance of the invention as a whole depends on precise and accurate coordination of the polygon mirror rotation with the photoreceptor motion. Real-time monitoring of the behavior of the polygon 14 and photoreceptor 18 must be of a sufficient precision that there is minimal error propagation affecting the function of the "electronic gearboxes." A key source of such errors derives from the "loss" of partial cycles of the polygon 14 and photoreceptor 18 when rotational velocities are repeatedly measured. The advantage of HRDVM's, particularly as described in the referenced patent, is that the HRDVM's take into account partial cycles when counting the number of cycles which occur in a given time frame. Thus, as the velocities of the polygon and photoreceptor are continuously monitored, as they are in the invention, errors relating to lost partial cycles will not accumulate and cause drift or other anomalies in the output of the HRDVM's, nor in the outputs of the electronic gearboxes.

While the invention has been described with reference to the structure disclosed, it is not confined to the details set forth, but is intended to cover such modifications or changes as may come within the scope of the following claims.

We claim:

1. A method of controlling a raster output scanner having a light source for emitting a modulated beam according to digital data at a pixel clock rate and a rotatable polygon mirror for causing the modulated beam to scan across a photosensitive surface in a fast-scan direction, comprising the steps of:

establishing a reference clock rate;

deriving a reference clock rate value from the reference clock rate;

monitoring polygon mirror velocity;

deriving a polygon mirror velocity value from the polygon mirror velocity;

determining a polygon mirror control value as a function of the reference clock rate value, the polygon mirror velocity value, and determining a predetermined control factor as a function of a selected magnification of an image recorded on the photosensitive surface; and selecting a velocity to rotate the polygon mirror as a function of the polygon mirror control value.

2. The method of claim 1, wherein the monitoring step includes the step of counting partial cycles of rotation of the polygon mirror within a predetermined time frame.

3. A method of controlling a raster-output scanner having a light source for emitting a modulated beam according to digital data at a pixel clock rate, a rotatable polygon mirror for causing the modulated beam to scan across a photosensitive surface in a fast-scan direction, and a motor for causing the photosensitive surface to move relative to the light beam in a slow-scan direction, comprising the steps of:

establishing a reference clock rate;

deriving a reference clock rate value from the reference clock rate;

monitoring motor velocity;

deriving a motor velocity value from the motor velocity;

determining a motor control value as a function of the reference clock rate value, the motor velocity value, and a predetermined first control factor;

selecting a velocity to rotate the motor as a function of the motor control value;

monitoring polygon mirror velocity;

deriving a polygon mirror velocity value from the polygon mirror velocity;

determining a polygon mirror control value as a function of the reference clock rate value, the polygon mirror velocity value, and a predetermined control factor; and selecting a velocity to rotate the polygon mirror as a function of the polygon mirror control value.

4. The method of claim 3, wherein the motor-velocity monitoring step includes the step of counting partial cycles of rotation of the motor within a predetermined time frame.

5. The method of claim 3, wherein the polygon-mirror velocity monitoring step includes the step of counting partial cycles of rotation of the polygon mirror within a predetermined time frame.

6. The method of claim 3, wherein the motor-control-value determining step includes the step of determining the control factor as a function of a selected aspect ratio of an image recorded on the photosensitive surface.

7. The method of claim 3, wherein the polygon-mirror-control-value determining step includes the step of determining the control factor as a function of a selected magnification of an image recorded on the photosensitive surface.

* * * * *